United States Patent [19]

Ismail et al.

[11] Patent Number: 4,476,720
[45] Date of Patent: Oct. 16, 1984

[54] UNIDIRECTIONAL FLUIDFLOW SENSOR SYSTEM

[75] Inventors: Raouf A. Ismail, Concord; Jonathan T. Mead, Framingham, both of Mass.

[73] Assignee: Cambridge Aero Instruments, Inc., Billerica, Mass.

[21] Appl. No.: 387,950

[22] Filed: Jun. 14, 1982

[51] Int. Cl.³ ............................ G01F 1/68; G01F 5/00
[52] U.S. Cl. ........................................ 73/202; 73/204; 340/606
[58] Field of Search ................ 73/202, 204, 861.65, 73/863.58, 863.61; 340/606

[56] References Cited

U.S. PATENT DOCUMENTS

| | | | |
|---|---|---|---|
| 2,009,427 | 7/1935 | Bentzel | 73/202 |
| 2,431,241 | 11/1947 | Godsey, Jr. | 73/204 X |
| 2,769,121 | 10/1956 | Rogoff | 73/204 X |
| 3,220,255 | 11/1965 | Scranton et al. | 73/204 |
| 3,372,590 | 3/1968 | Sterling | 73/204 |
| 3,803,921 | 4/1974 | Dieterich | 73/863.61 |
| 3,937,082 | 2/1976 | Schilling | 73/866.54 |
| 4,083,244 | 4/1978 | Agar et al. | 73/204 |
| 4,215,565 | 8/1980 | Zanker | 73/202 |
| 4,393,300 | 7/1983 | Proctor | 340/640 |

Primary Examiner—Herbert Goldstein
Attorney, Agent, or Firm—Joseph S. Iandioro

[57] ABSTRACT

A unidirectional fluidflow sensor system including: a sensing chamber for placement in a fluidflow to be monitored; the chamber including input port means facing toward the fluidflow and smaller, output port means spaced from the input port means and disposed transversely to the fluidflow; a sensing element in the chamber in the path between the first and second port means; and means, responsive to the element, for detecting a change in flow between the input and output port means.

15 Claims, 18 Drawing Figures

STILL AIR CHARACTERISTIC

UNIDIRECTIONAL FLUIDFLOW SENSOR SYSTEM

FIELD OF INVENTION

This invention relates to a unidirectional fluidflow sensor system, and more particularly to such a system which is sensitive to variations in flow and discriminates between forward and reverse flow.

BACKGROUND OF INVENTION

Fluidflow systems are used in many applications to provide heating and cooling to buildings and equipment. One of the most common forms is by forced air moved by fans. It is useful and often necessary to monitor the airflow (or other fluidflow) in order to provide a signal if the airflow ceases or drops below a predetermined level. Traditionally, a number of types of airflow switches or sensors have been made, including vane switches and heated thermostat switches. In vane switches a vane deflected by normal airflow returns to its initial position as the flow decreases until a contact on the vane engages a fixed contact and closes a certain circuit. Such switches are subject to failure due to dirt in the bearings and dirt on the contacts, intermittent contact closure, contact bounce, imprecise calibration and unpredicted contact action due to random vibration and other causes. Heated thermostat switches also are subject to dirt buildup on contacts and have very slow reaction times. Both are subject to contact deterioration.

More recently, two so-called solid state switches have been used. One type employs a self-heated temperature-sensitive resistance (thermistor), whose temperature remains constant with constant airflow. Upon decrease of the flow there is less heat dissipation and the temperature rises, causing a lowering of resistance. When the condition deteriorates sufficiently the resistance reduction reaches a pre-established value, which functions as a trip point and is detected as an alarm condition. In another type, using a self-heated temperature-sensitive resistance (posistor), upon decrease of the flow there is less heat dissipation and the temperature rises, causing the resistance to approach a knee value where the resistance abruptly changes. When the conditions deteriorate sufficiently for the knee value to be reached it changes abruptly and functions as a trip point, which is detected as an alarm condition. The use of the area of abrupt change or the "knee" of the characteristic limits the range of trip points selectable for operation and may introduce a lack of precision into the detection process. In addition, these devices are bidirectionally sensitive: equally sensitive to flow variations in the forward and the reverse direction. This bidirectionality is problematic: in many cases a duct, plenum or other area of airflow is served by a number of fans. If one fan fails the increased pressure and flow in the area generates a reverse flow through that stopped fan and any associated airflow switch, thereby maintaining a false indication of proper flow.

SUMMARY OF INVENTION

It is therefore an object of this invention to provide an improved fluidflow sensor system which discriminates between forward and reverse flow.

It is a further object of this invention to provide such a fluidflow sensor system which is simple, reliable and inexpensive.

It is a further object of this invention to provide such a fluidflow sensor system which is without moving parts and not subject to contact failure, bearing failure and other types of failure due to wear and contamination.

It is a further object of this invention to provide such a fluidflow sensor system whose operating point may be precisely selected over a wide range of operation.

The invention results from the realization that a truly simple and effective unidirectional fluidflow switch can be constructed by providing an outlet port or ports in the monitoring chamber, which is smaller than and transverse to the input port facing the flow, and that precision trip-point operation can be achieved by operating on a linear portion of the characteristic of the sensor.

The invention features a unidirectional fluidflow sensor system including a sensing chamber for placement in a fluidflow to be monitored. The chamber includes input port means facing toward the fluidflow, and smaller, output port means spaced from the input port means and disposed transversely to the fluidflow. A sensing element is located in the chamber in the path between the input and output port means. There are means responsive to the element for detecting a change in flow between the input and output port means. In a preferred embodiment the input port means is a hole in the side of the chamber and the output means is a hole in the end of the chamber. Alternatively, the input port means may be a hole in the side of the chamber and the output port means may include one or two holes in the adjacent side or sides of the chamber. The sensing element may be one whose resistance varies with temperature. More particularly, it may be a thermistor with a negative resistance/temperature characteristic. It could also be a posistor with a positive resistance/temperature characteristic. The sensing element resistance characteristic may have a generally linear region, and the means for detecting may operate in that linear region. The chamber may include a baffle separating the chamber into one section including the input port means and a second section including the output port means. The baffle includes a hole interconnecting the sections, and the sensing element is disposed in the hole. The means for detecting may be mounted on a circuit board and the baffle may be constituted by at least a portion of that board.

DISCLOSURE OF PREFERRED EMBODIMENT

Other objects, features and advantages will occur from the following description of a preferred embodiment and the accompanying drawings, in which.

Figure 1:
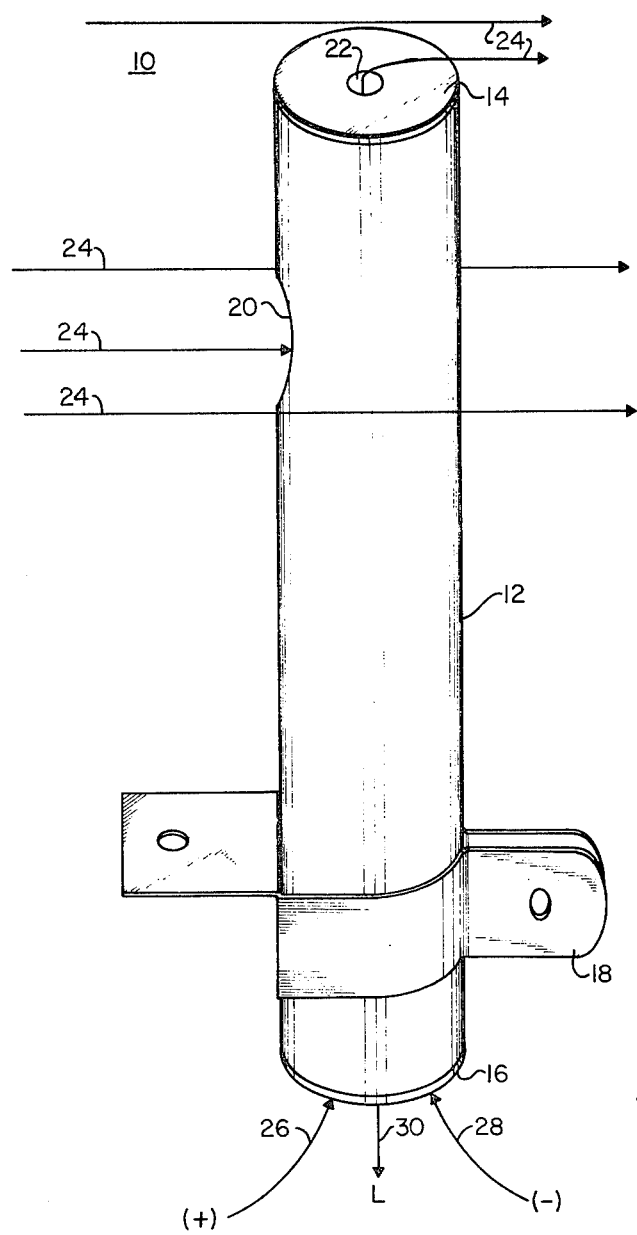
FIG. 1 is an axonometric view of a unidirectional fluidflow sensor system according to this invention.

There is shown in FIG. 1 a unidirectional fluidflow sensor system 10 according to this invention including a tubular housing 12, a cap 14, and a base 16. Bracket 18 is provided for mounting system 10 in airflows to be monitored. Housing 12 may be formed of 3¼ inch long, ½ inch diameter thin-walled aluminum tubing approximately 1/32 inch thick, provided with an input port 20 of 8 mm diameter and an output port 22 of approximately ⅛ inch or 3 mm diameter. Cap 14 and base 16 may be formed of plastic and designed for a snap-fit engagement with housing 12, as will be explained subsequently.

Unidirectional fluidflow sensor system 10 is placed in an airflow indicated by arrows 24 so that input port 20 faces directly into the airflow and outlet port 22 is transverse to that flow. The air flow is in input port 20 and out output port 22. A heat-sensitive resistance element in the chamber between input port 20 and output port 22 responds to variations in flow by increasing or decreasing its resistance. This change in resistance is detected by a circuit, typically contained in housing 12, which is provided with power on lines 26 and 28 and produces an alarm signal on line 30 when the airflow drops below a predetermined level.

Figure 2:
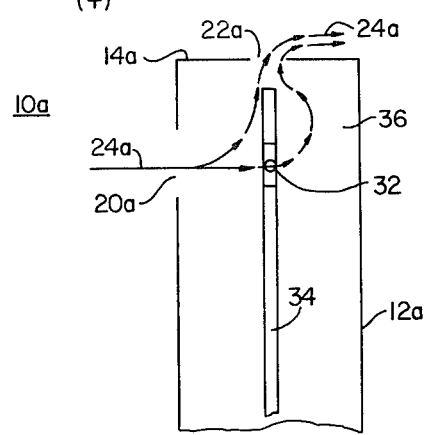
FIG. 2 is a side elevational diagrammatic view of the upper portion of the unidirectional fluidflow sensor system of FIG. 1 illustrating the airflow through the chamber, with the output port located in the end or top of the chamber.

In one construction, airflow 24a, FIG. 2, flows through input port 20a, around heat-sensitive resistance 32 mounted in baffle 34 which may be a circuit board, and exits through output port 22a. The flow through chamber 36 is facilitated by the internal pressure in chamber 36 being above the ambient pressure at output port 22a.

Figure 3:
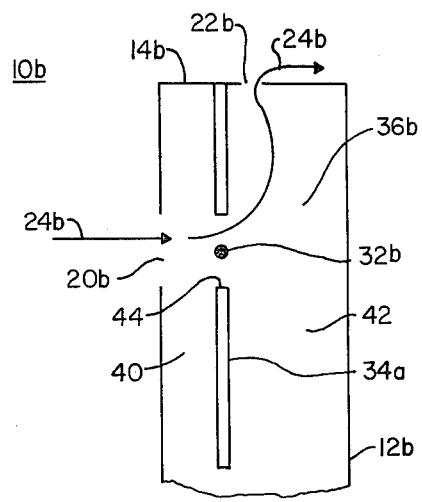
FIG. 3 is a view similar to FIG. 2 of an alternative construction in which the circuit board functions as a baffle.

In a preferred construction, unidirectional fluidflow sensor system 10b, FIG. 3, baffle 34a, which may be implemented by the circuit board containing the detector circuit, is positioned against cap 14b and in front of output port 22b, so that it divides chamber 36b into two sections: section 40, which contains input port 20b, and section 42, which contains output port 22b. Heat-sensitive element 32b is mounted across hole 44, which interconnects sections 40 and 42.

Figure 4:
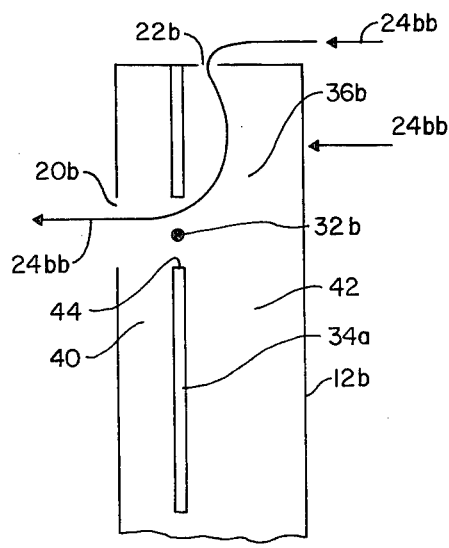
FIG. 4 is a view similar to FIG. 3 depicting the reverse airflow through the chamber.

Under reverse flow conditions, some of the flow 24bb, FIG. 4, is diverted into output port 22b and around heat-sensitive resistance 32b in hole 44 of baffle 34a, and then out input port 20b. The transverse placement of output port 22b with respect to input port 20b, and the smaller size of output port 22b with respect to input port 20b, provides a response ratio of five or more to one in the reverse direction in comparison to the forward direction. In the reverse flow condition as shown in FIG. 4, in contrast to the forward flow condition shown in FIG. 3, the internal pressure in chamber 36b and at input port 20b is slightly below ambient pressure, which facilitates the drawing of the flow 24bb into output port 22b and out input port 20b.

The output port means may include more than one discrete output port, and the output port(s) may be in a location other than the top of housing 12 but still transverse to the flow direction. For example, in FIG. 5 the outlet port means includes two output ports 22c, 22cc, in the sides of housing 12c transverse to the airflow 24c.

Figure 5:
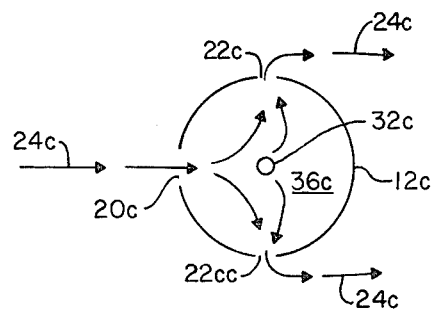
FIG. 5 is a top plan diagrammatic view showing the airflow through a chamber with two side output ports.
Figure 6:
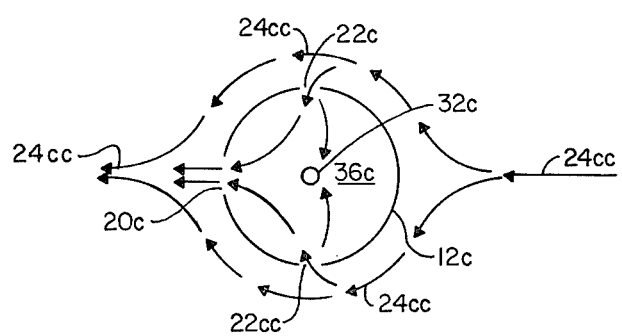
FIG. 6 is a view similar to FIG. 5 showing reverse airflow through the chamber.
Figure 7:
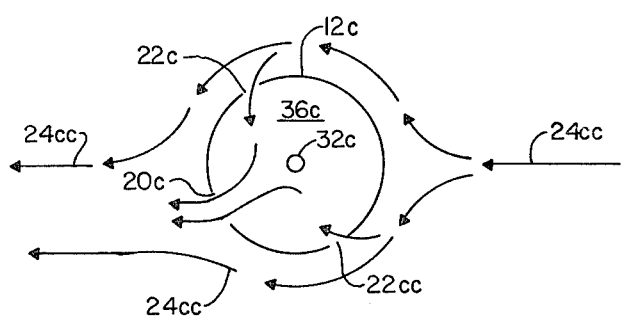
FIG. 7 is a view similar to FIG. 6 illustrating reverse airflow when the chamber is skewed with respect to the airflow.

The reverse airflow 24cc, FIG. 6, is drawn in through output ports 22c, 22cc and across heat-sensitive resistance 32c by the presence of the slightly lower pressure in the area of input port 20c. The use of two output ports in the constructions of FIGS. 5 and 6 is advantageous because it inherently compensates for misalignment of the input port 20c with the primary airflow direction, as shown in FIG. 7, where housing 12c is inclined somewhat to the primary direction of the airflow 24cc. Under those conditions, the airflow entering output port 22cc is stronger than would be the case if housing 12c were aligned as it is in FIG. 6. However, offsetting this is the fact that output port 22c has a somewhat lesser airflow through it so that the average airflow is maintained constant. In extreme cases, where the flow is very heavy through output port 22cc, a slightly lower pressure develops at output port 22c, which will draw some of the airflow through chamber 36c and out output port 22c, thereby maintaining the average flow constant.

Figure 8:
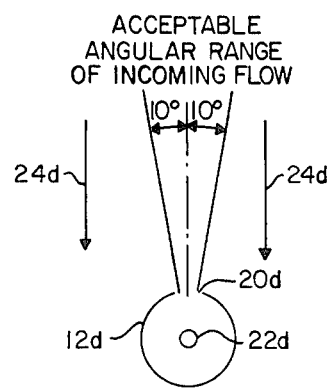
FIG. 8 is a plan view of the end of the chamber showing the acceptable angular range for incoming flow.
Figure 9:
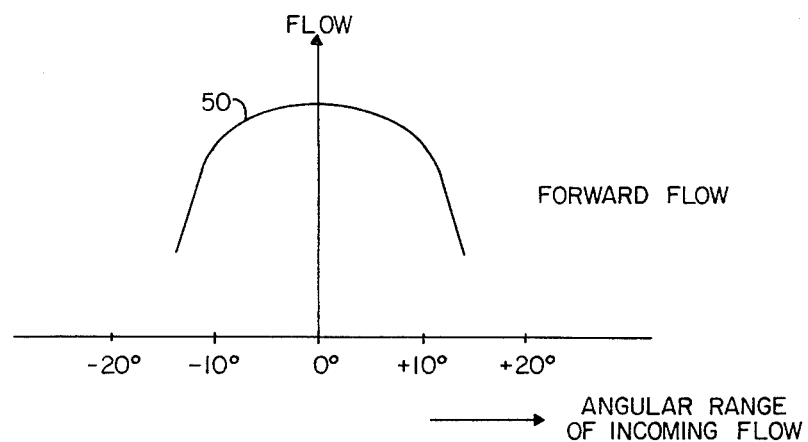
FIG. 9 is the forward flow characteristic over the angular range illustrated in FIG. 8.

Although misalignment can be a problem under some circumstances, substantial latitude in the placement of the unidirectional fluidflow sensor system according to this invention is provided. A typical acceptable angular range of incoming flow is ten degrees on either side of the flow 24d, FIG. 8. The falloff in sensitivity after ten degrees is substantial, as indicated by the fluidflow versus the angular rate characteristic 50, FIG. 9, which shows a sharp drop in flow and thus in sensitivity of the sensing mechanism beyond ten degrees on either side of the center.

Figure 10:
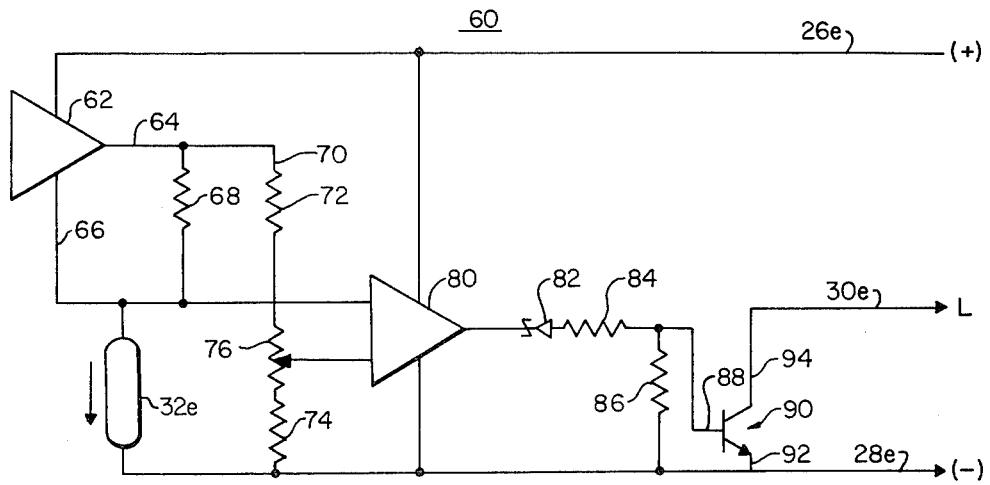
FIG. 10 is a schematic diagram of a detector circuit.

Circuit 60, the means for detecting the variations in resistance in heat-sensitive resistance element 32, FIG. 10, may include an integrated circuit regulator 62 which upon receiving a 9–15 volt input on line 26e provides a fixed five-volt level on its output 64 relative to its terminal 66. The five-volt level across resistor 68 produces a current, over 99% of which flows through the heat-sensitive resistor element, thermistor 32e. The voltage divider 70 is connected between terminal 64 and ground line 28e. Voltage divider 70 includes two fixed resistors 72, 74, and a variable resistor 76, by means of which the reference voltage to operational amplifier 80 may be set.

The output of operational amplifier 80 is received by zener diode 82, which filters out low-voltage noise signals below, for example, about six volts. Zener diode 82 is connected through limiting resistor 84 to biasing resistor 86 and the base 88 of transistor 90, whose emitter 92 is connected to ground line 28 and whose collector 94 is connected via line 30e to an alarm circuit or other load L.

In operation, with the airflow at or above the predetermined level, the heat generated by thermistor 32e is dissipated sufficiently so that the resistance remains constant and above the reference level set by variable resistance 76. Thus the output from operational amplifier 80 is at a low level, and transistor 90 is maintained in the "off" condition. When the airflow drops below some predetermined critical level, the temperature of thermistor 32e rises, causing the resistance to drop. Thus the input to operational amplifier 80 also decreases below the reference voltage fixed by variable resistance 76. In this condition, the output of operational amplifer 80 goes to the high level, transistor 90 is switched on, and a signal is provided on line 30e to the load.

Figure 11:
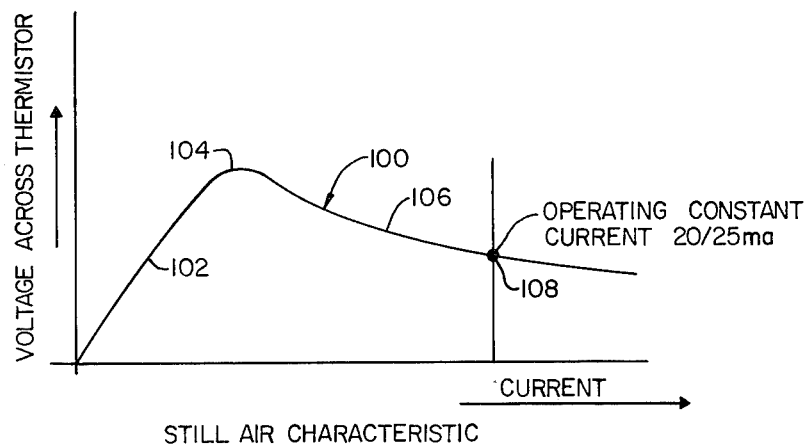
FIG. 11 is a voltage versus current characteristic of the thermistor used in the circuit of FIG. 10.
Figure 12:
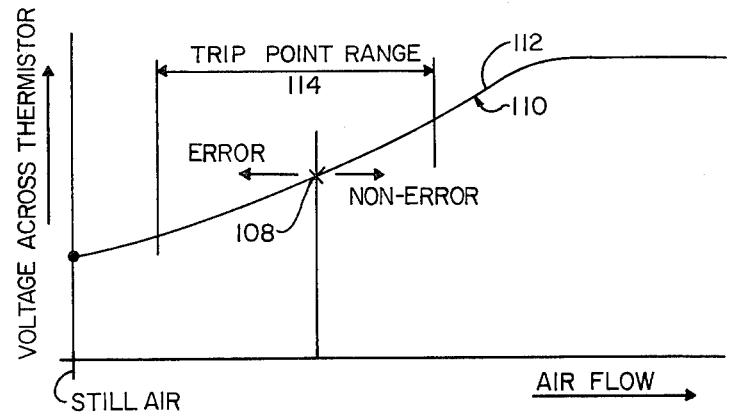
FIG. 12 is the voltage versus airflow characteristic of the thermistor in the circuit of FIG. 10.

The still air characteristic 100, FIG. 11, of thermistor 32e consists of a positive slope 102, and a knee 104 at which the characteristic abruptly swings to the negative resistance slope 106. It is on this negative-resistance, generally linear slope 106 that the operating point or quiescent point 108 of the circuit is set. Typically, in circuit 60 thermistor 32e is set to operate at 25 milliamps. The voltage across the thermistor depends on the thermistor temperature, hence its resistance. Typically, this system runs with about four volts developed across a conventional glass bead thermistor. Other thermistors would have different current, resistance and voltage. By monitoring the sensitivity of thermistor 32e in the linear range, the trip point, or operating point 108 may be set in any of a variety of positions in the linear range with predictable results, as shown in FIG. 12, where the characteristic 110 of voltage versus airflow is shown as having a large linear region 112 which accommodates a large trip point range 114 in which the trip point 108 can be set by adjusting variable resistor 76, FIG. 10. The entire circuit 60, FIG. 10, may be mounted on circuit board 34f, FIGS. 13 and 14, which also functions as a baffle. At the top of circuit board 34f is hole 44f across which is mounted thermistor 32e. The bottom of circuit board 34f is supported on base 16f through which extend three pins 26f, 28f and 30f. Cap 16f, FIG. 14, includes a pair of upstanding members 120, 122, each of which contains a detent 124, 126 which snap into holes 128, 130 in housing 12f.

Figures 13, 14:
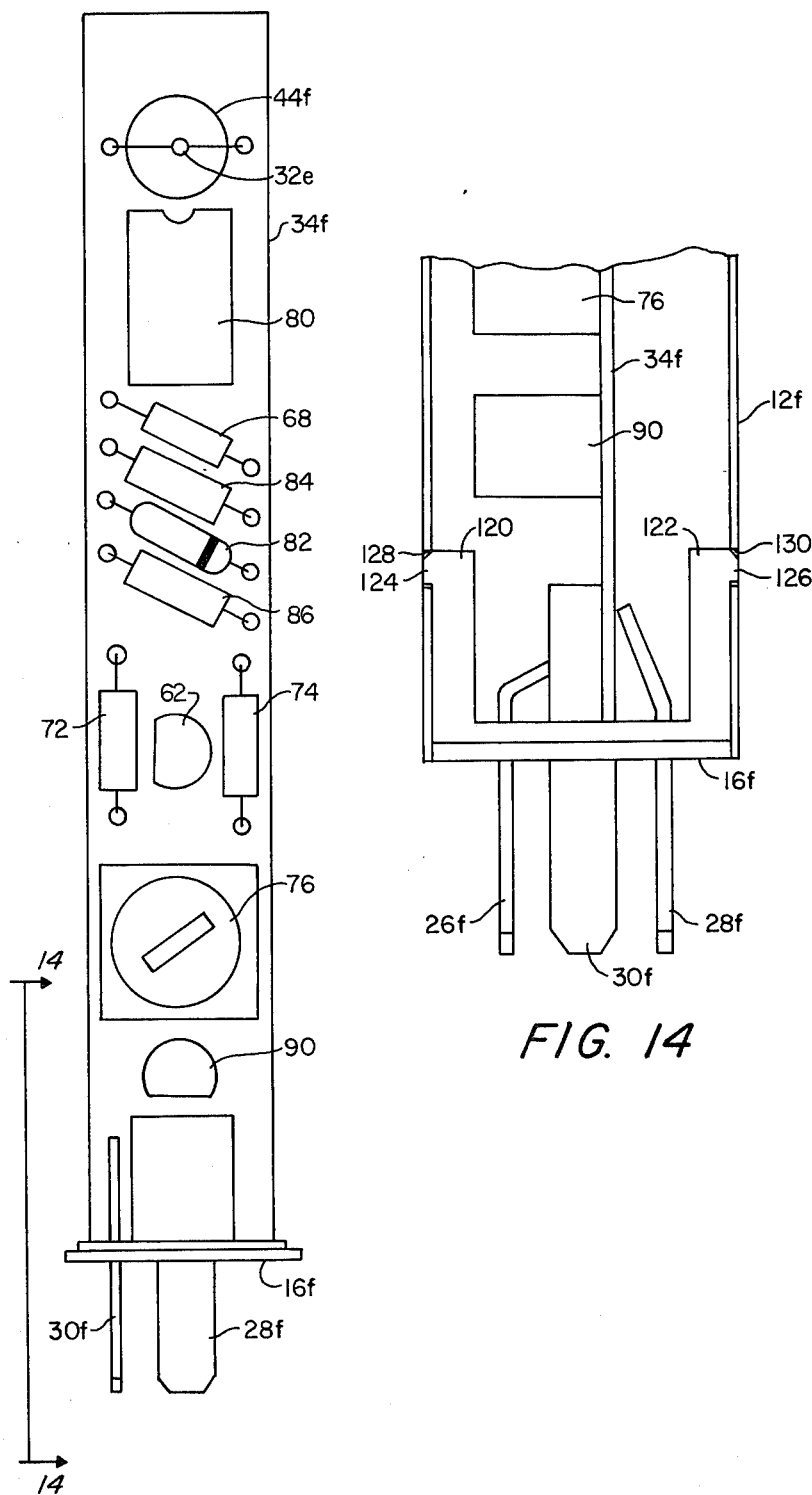
FIG. 13 is a front elevational view showing the placement of the components of the circuit of FIG. 10 on a circuit board.
FIG. 14 is an exploded view taken along line 14—14 of FIG. 13.
Figure 15:
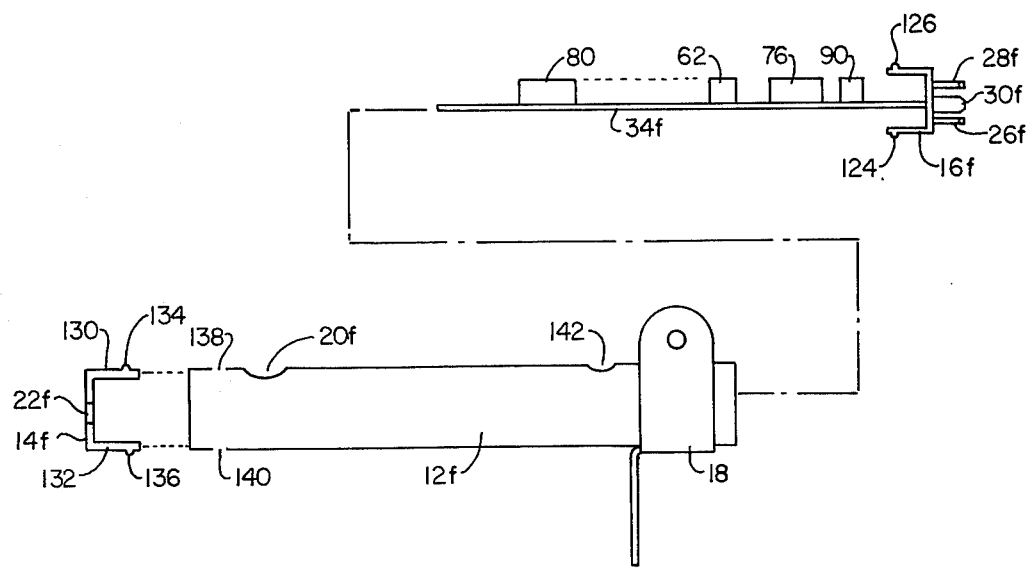
FIG. 15 is a side exploded assembly view of the unidirectional fluidflow sensor system according to this invention.

The entire circuit board assembly, FIGS. 13 and 14, may be inserted in the lower end of housing 12f as shown in FIG. 15. The top end is closed by cap 14f, which includes a pair of arms 130, 132 with detents 134, 136 that engage holes 138, 140 to fix cap 14f to housing 12f in the same manner as base 16f. A hole 142 in housing 12f provides access to variable resistance 76 for fine tuning of the system.

Figure 16:
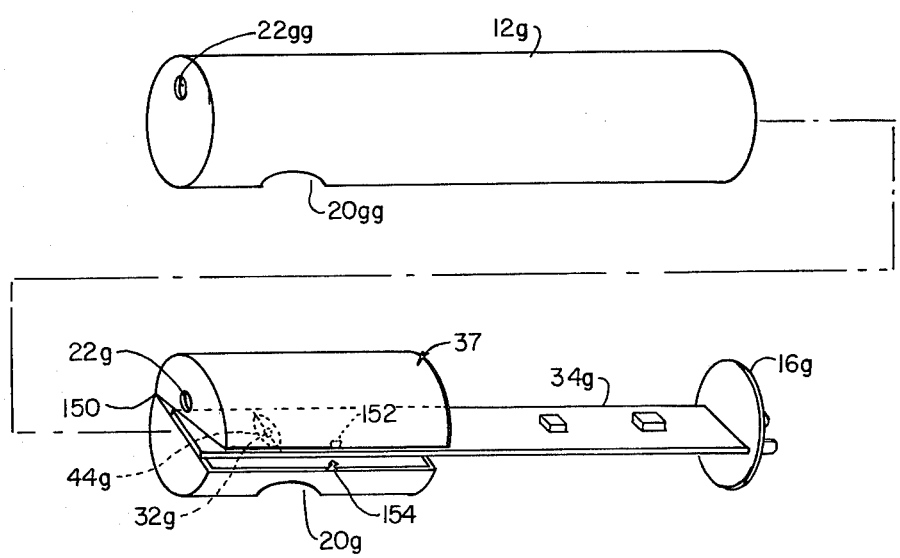
FIG. 16 is an exploded assembly view of an alternative construction of a unidirectional fluidflow sensor system according to this invention.

In an alternative construction, circuit board 34g, FIG. 16, mounted on base 16g may be captured at its upper end in a split plastic cylinder 37, which is hinged along one side 150 and has some means such as hole 152 and detent 154 for fixing together the two cylindrical halves and capturing the end of circuit board 34g, containing hole 44g, across which is located heat-sensitive resistance 32g. Cylinder 37 is provided with an input port 20g and output port 22g. When the entire assembly including cylinder 37, circuit board 34g and cap 16g are inserted in housing 12g, input port 20g in cylinder 37 aligns with input port 20gg in housing 12g and output port 22g in cylinder 37 aligns with output port 22gg in housing 12g.

Figure 17:
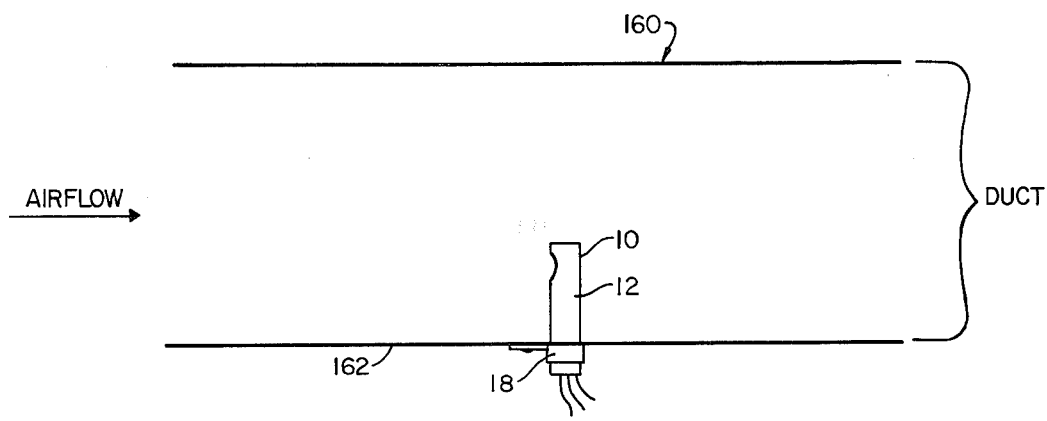
FIG. 17 is a diagrammatic view showing one placement of the fluidflow sensor system according to this invention in a duct.
Figure 18:
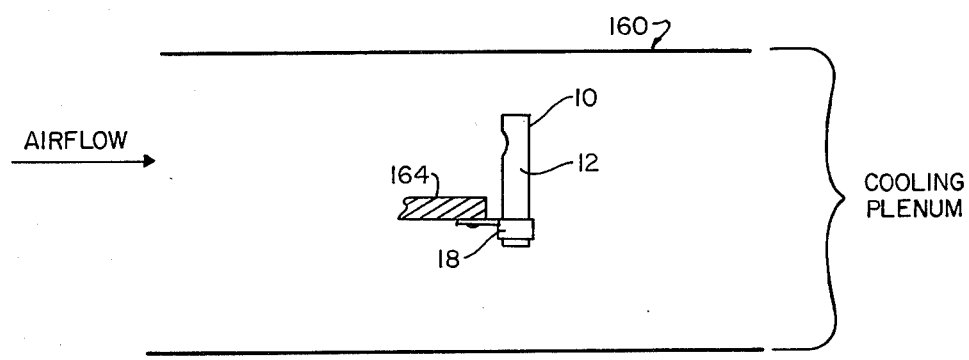
FIG. 18 is a diagrammatic view showing another technique for mounting the unidirectional fluidflow sensor system according to this invention.

In use, a unidirectional fluidflow sensor system 10 according to this invention is inserted in a duct 160, FIG. 17, by attaching bracket 18 to one wall 162 of duct 160, or alternatively, a mounting surface 164, FIG. 18, for engaging bracket 18 may be provided wholly within the duct or plenum 160.

Other embodiments will occur to those skilled in the art and are within the following claims:

What is claimed is:

1. A unidirectional fluidflow sensor system comprising:
   a sensing chamber for placement in a fluidflow to be monitored; said chamber including input port means which includes a hole on the side of said chamber facing toward the fluidflow and output port means which includes two holes, one on each adjacent side of said chamber and disposed transversely to said fluidflow;
   a sensing element in said chamber in the path between said input and output port means; and
   means, responsive to said element, for detecting a change in flow between said input and output port means.

2. The unidirectional fluidflow sensor system of claim 1 in which said sensing element includes a resistance which varies with temperature.

3. The unidirectional fluidflow sensor system of claim 2 in which said sensing element is a thermistor with a negative resistance characteristic.

4. The unidirectional fluidflow sensor system of claim 2 in which said sensing element includes a resistance characteristic which has a generally linear region and said means for detecting operates in said linear region.

5. A unidirectional fluidflow sensor system comprising:
   a sensing chamber for placement in a fluidflow to be monitored; said chamber including input port means facing toward the fluidflow, output port means spaced from said input port means and disposed transversely to said fluidflow and a baffle separating said chamber into one section including said input port means and a second section including said output port means, said baffle including a hole interconnecting said sections;
   a sensing element disposed in said hole in said baffle; and
   means, responsive to said element, for detecting a change in flow between said input and output port means.

6. The unidirectional fluidflow sensor system of claim 5 in which said input port means is a hole on the side of said chamber and said output port means is a hole on the end of said chamber.

7. The unidirectional fluidflow sensor system of claim 5 in which said sensing element includes a resistance which varies with temperature.

8. The unidirectional fluidflow sensor system of claim 7 in which said sensing element is a thermistor with a negative resistance characteristic.

9. The unidirectional fluidflow sensor system of claim 7 in which said sensing element includes a resistance characteristic which has a generally linear region and said means for detecting operates in said linear region.

10. The unidirectional fluidflow sensor system of claim 5 in which said means for detecting is mounted on a circuit board and said baffle is constituted by at least a portion of that board.

11. A unidirectional fluidflow sensor system comprising:
 a sensing chamber for placement in a fluidflow to be monitored; said chamber including input port means facing toward the fluidflow, output port means spaced from said input port means and disposed transversely to said fluidflow and a baffle separating said chamber into one section including said input port means and a second section including said output port means said baffle including a hole therein;
 a sensing element disposed in said hole in said baffle; and
 means, responsive to said element, for detecting a change in flow between said input and output port means, said means for detecting being mounted on a circuit board and said baffle being constituted by at least a portion of that board.

12. The unidirectional fluidflow sensor system of claim 11 in which said input port means is a hole on the side of said chamber and said output port means is a hole on the end of said chamber.

13. The unidirectional fluidflow sensor system of claim 11 in which said sensing element includes a resistance which varies with temperature.

14. The unidirectional fluidflow sensor system of claim 13 in which said sensing element is a thermistor with a negative resistance characteristic.

15. The unidirectional fluidflow sensor system of claim 13 in which said sensing element includes a resistance characteristic which has a generally linear region and said means for detecting operates in said linear region.

* * * * *